United States Patent [19]

Phillips et al.

[11] Patent Number: 5,649,147

[45] Date of Patent: Jul. 15, 1997

[54] CIRCUIT FOR DESIGNATING INSTRUCTION POINTERS FOR USE BY A PROCESSOR DECODER

[75] Inventors: Christopher E. Phillips; Mario Nemirovsky, both of San Jose, Calif.

[73] Assignee: National Semiconductor Corporation, Santa Clara, Calif.

[21] Appl. No.: 451,495

[22] Filed: May 26, 1995

[51] Int. Cl.$^6$ ............................................. G06F 12/04
[52] U.S. Cl. ........................... 395/421.04; 364/749
[58] Field of Search ...................... 395/421.09, 421.08, 395/381, 383; 364/786, 749, 736

[56] References Cited

U.S. PATENT DOCUMENTS

| | | | |
|---|---|---|---|
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |
| 5,410,721 | 4/1995 | Divine et al. | 395/800 |
| 5,517,440 | 5/1996 | Widigen et al. | 364/786 |
| 5,548,546 | 8/1996 | Jang et al. | 364/786 |

OTHER PUBLICATIONS

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L-T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160 –Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237A–5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

(List continued on next page.)

*Primary Examiner*—David Y. Eng
*Assistant Examiner*—Gautam R. Patel
*Attorney, Agent, or Firm*—Limbach & Limbach L.L.P.

[57] ABSTRACT

A circuit designates the values of an M bit first pointer and of an N+M bit second pointer. A first register circuit network holds the M bit first pointer, and a second register circuit network into holds an M bit portion of the N+M bit second pointer. A third register circuit network holds the remaining N bit portion of the N+M bit second pointer. A combiner circuit network, connected to receive the M bit first pointer from the first register circuit network, combines the received M bit first pointer with an externally provided data element length value to generate a new M bit first pointer. The combiner circuit network selectively generates a carry signal. The new M bit first pointer is selectively provided for loading into the first register circuit network and for loading into the second register circuit network as the M bit portion of the N+M bit portion of the second pointer. The remaining N bit portion of the N+M bit second pointer is received from the third register circuit network and, in response to the carry signal, one of the received remaining N bit portion and a modified remaining N bit portion is provided as a new remaining N bit portion for loading the new remaining N bit portion into the third register circuit network.

9 Claims, 2 Drawing Sheets

OTHER PUBLICATIONS

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9-15 thru 9-17.

Intel Corp., Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3-28 thru 3-32.

| | |
|---|---|
| 0h | instr. byte 8h |
| 1h | instr. byte 9h |
| 2h | |
| 3h | |
| 4h | |
| 5h | |
| 6h | |
| 7h | |
| 8h | instr. byte 0h |
| 9h | instr. byte 1h |
| Ah | instr. byte 2h |
| Bh | instr. byte 3h |
| Ch | instr. byte 4h |
| Dh | instr. byte 5h |
| Eh | instr. byte 6h |
| Fh | instr. byte 7h |

CIRCUIT FOR DESIGNATING INSTRUCTION POINTERS FOR USE BY A PROCESSOR DECODER

TECHNICAL FIELD OF THE INVENTION

The present invention relates to a circuit for designating instruction pointers for use by a processor decoder, and in particular, to an instruction pointer designation circuit that employs a minimum amount of transistors such that it occupies a small amount of chip space and operates with relatively low power.

BACKGROUND OF THE INVENTION

It is well known in the art of computer architecture that instructions to be executed by a processor may be first fetched into an instruction decoder and then decoded. In particular, an instruction may specify, in an encoded form in one portion or field, of the instruction, an operation which is to be performed. Another portion of the instruction may specify the operands on which the operation is to be performed. The operation and the operands are determined by decoding the instruction in portions, before the operation is performed. For more background information, the reader is referred to *Computer Architecture: A Quantitative Approach*, by Patterson and Hennessy (Morgan Kaufman, 1990), Chapter 5.

In a processor decoder architecture of the type disclosed in co-pending and commonly assigned U.S. patent application Ser. No. 08/445,563, entitled "TAGGED PREFETCH AND INSTRUCTION DECODER FOR VARIABLE LENGTH INSTRUCTION SET AND METHOD OF OPERATION", filed on even date herewith, processor instructions to be decoded are first fetched (e.g., from the processor memory or from an instruction cache) and stored into a circular "line buffer". The address in the line buffer at which the first byte of a fetched instruction is stored is determined by the least significant bits of the address in the memory at which the instruction begins. Then, the bytes of the instruction are stored into the line buffer sequentially. When the last byte of the line buffer is reached, the next byte of the instruction "wraps around" to be stored into the first byte of the line buffer.

For example, as shown in FIG. 1, a line buffer 100 may have sixteen locations (i.e., locations with addresses 0h to Fh). An instruction of length Ah (i.e., bytes 0h through 9h), beginning at location FA38h in processor memory, would be stored into the line buffer at line buffer locations 8h, 9h, Ah, Bh, Ch, Dh, Eh, Fh, 0h, and 1h, as also shown in FIG. 1.

What is desired is a circuit which can be used to maintain a first pointer which always points to the beginning processor memory address of an instruction currently being decoded; and a second pointer which points to a location in a line buffer. The second pointer may be incremented as the instruction is "consumed" by the decoder, to point to the next instruction portion to be processed by the decoder. In any event, however, the second pointer should point to the beginning of an instruction in the line buffer when the decoder begins to process that instruction.

SUMMARY OF THE INVENTION

A circuit in accordance with the present invention designates the values of an M bit first pointer and of an N+M bit second pointer. A first register circuit network holds the M bit first pointer, and a second register circuit network into holds an M bit portion of the N+M bit second pointer. A third register circuit network holds the remaining N bit portion of the N+M bit second pointer. A combiner circuit network, connected to receive the M bit first pointer from the first register circuit network, combines the received M bit first pointer with an externally provided data element length value to generate a new M bit first pointer. The combiner circuit network selectively generates a carry signal. The new M bit first pointer is selectively provided for loading into the first register circuit network and for loading into the second register circuit network as the M bit portion of the N+M bit portion of the second pointer. The remaining N bit portion of the N+M bit second pointer is received from the third register circuit network and, in response to the carry signal, one of the received remaining N bit portion and a modified remaining N bit portion is provided as a new remaining N bit portion for loading the new remaining N bit portion into the third register circuit network.

A better understanding of the features and advantages of the invention will be obtained by reference to the following detailed description and accompanying drawings which set forth an illustrative embodiment in which the principles of the invention are utilized.

BRIEF DESCRIPTION OF THE FIGURES

FIG. 1 schematically illustrates a conventional sixteen location line buffer.

DETAILED DESCRIPTION

Figure 2:
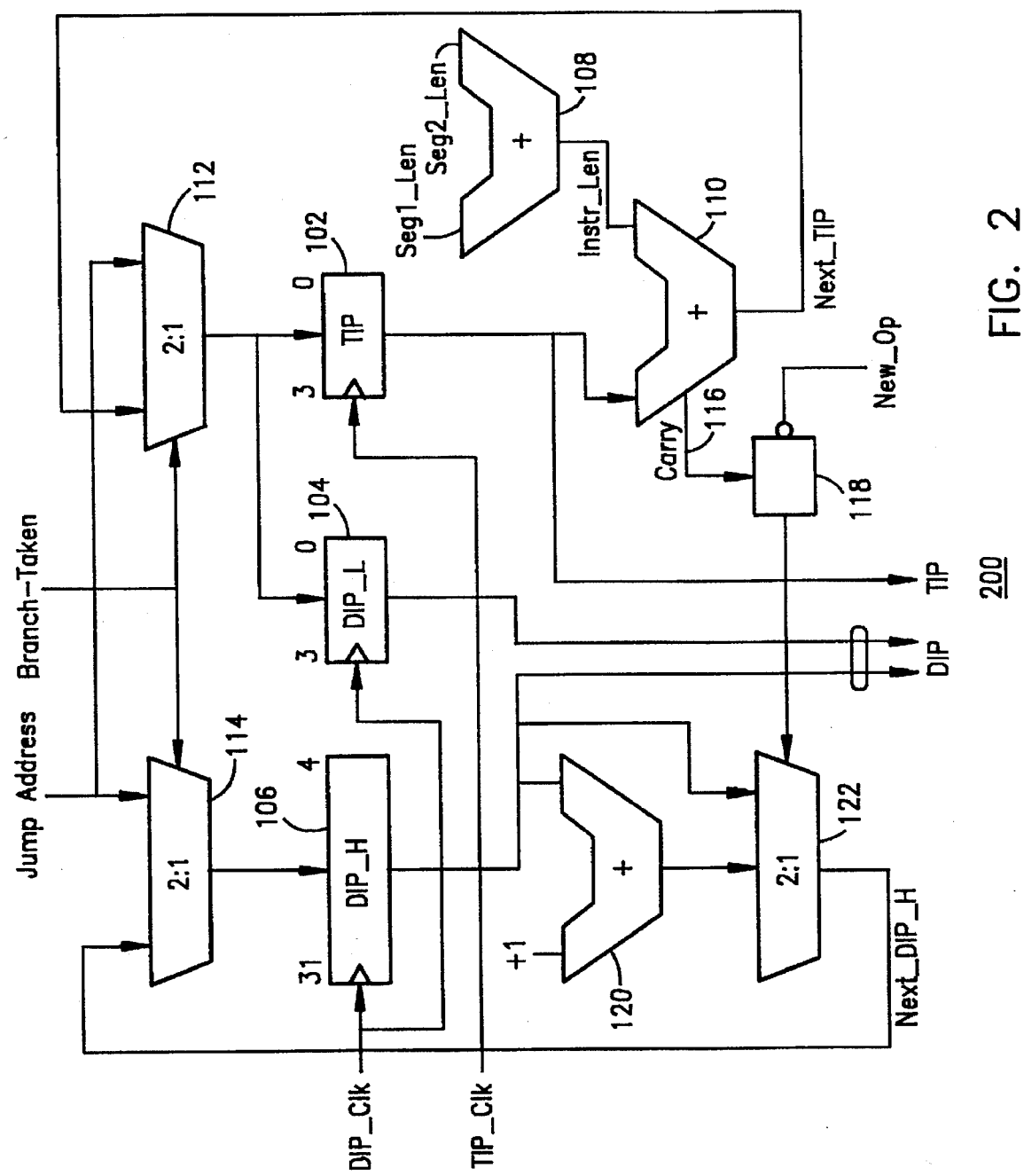
FIG. 2 schematically illustrates an instruction pointer designation circuit in accordance with the present invention.

FIG. 2 schematically illustrates an instruction pointer designation circuit 200 in accordance with the present invention. A temporary instruction pointer ("TIP") register 102 holds a TIP value that points to an instruction (or portion of an instruction) in a line buffer, such as in the line buffer 100 (shown in FIG. 1). The TIP register 102 is shown to have four bits, such that a TIP value contained within the TIP register 102 may point to any location in a sixteen (i.e., $2^4$) location line buffer.

A demand instruction pointer ("DIP") value is collectively held within two registers, DIP_L 104 and DIP_H 106. The DIP value always points to the beginning processor memory address of an instruction currently being decoded by a decoder (not shown). In particular, DIP_L register 104 holds the least significant four bits (0 through 3) of the beginning processor memory address of the instruction currently being decoded; and DIP_H register 106 holds the most significant twenty-eight bits (4 through 31) of the beginning processor memory address of the instruction currently being decoded.

A first adder 108 has as its inputs the lengths of the various segments of the instruction currently being decoded, as determined by the decoder. Thus, the minimum required size of the adder 108 is determined by the instruction segment lengths. While the FIG. 2 embodiment 200 shows two segment lengths, Seg1_len and Seg2_len being input to the adder 108, the number of values to be input to the adder 108 in a particular embodiment of the present invention are dependent on the possible formats of the particular instructions being decoded. The adder 108 adds together the lengths of the various segments to determine the total instruction length, Instr_len, which is provided to the output of the adder 108. Alternatively, one or more adders may be employed to accumulate the segment lengths of an instruction as the instruction is being decoded.

A second adder 110, which is a four bit adder, is connected to receive, first, the Instr_len output of the first adder 108;

and, second, the current value of the TIP register 102. The adder 110 adds together the total instruction length value, Instr_len, and the current value of the TIP register 102, to determine the location, Next_TIP, in the line buffer of the next instruction to be decoded. Next_TIP is the value which is to be loaded into the TIP register 102 and the DIP_L register 104 after the current instruction is completely decoded by the decoder, but before the next instruction is decoded. (This assumes that the current instruction is not a branch instruction. The special situation of the current instruction being a branch instruction is discussed in detail below, with respect to the data selectors 112 and 114.) In the process of adding, the adder 110 generates a "carry" signal 116 if the addition result exceeds four bits. The carry signal 116 is buffered by a one bit buffer 118.

The significance of the carry signal is now discussed. Using the example of the FIG. 1 line buffer 100, generation of the carry signal 116 indicates a "wrap-around" back to or through the beginning of the line buffer 100. Generation of the carry signal 116 also indicates that the most significant portion of the DIP value (i.e, the portion held in the DIP_H register 106) must be incremented upon completion of decoding of the current instruction.

Turning now to the mechanism for updating the most significant portion of the DIP value, a twenty-eight bit incrementer 120 is connected to receive the current value held in the DIP_H register 106 and provides the current value held in the DIP_H register 106, plus one, to a first data input of a two-to-one data selector 122. The other data input of the two-to-one data selector 122 is connected to receive the current value held in the DIP_H register 106. Which of the values provided to the first and second data inputs of the two-to-one data selector 122 is provided to the data output of the two-to-one data selector 122 is determined by the carry signal 116 buffered in the one bit buffer 118. Thus, the value, Next_DIP_H, provided at the data output of the two-to-one data selector 122 indicates the most significant portion of the beginning processor memory address of the next instruction to be decoded by the decoder.

The special situation of the current instruction being a branch instruction is now discussed. Referring to the Next_TIP value generated by the adder 110, the Next_TIP value is provided to a first data input of the two-to-one data selector 112. If the decoder determines that the current instruction is a branch instruction (i.e., an instruction that changes the sequence in which the program instruction are to be executed), the decoder both provides a "Jump Address" value to the second data input of the two-to-one data selector 112 and asserts the Branch_Taken signal.

If the Branch_Taken signal is not asserted, the Next_TIP value is provided from the output of the two-to-one data selector 112 to the TIP register 102 and the DIP_L register 104. On the other hand, if the Branch_Taken signal is asserted, the Jump_Address value is provided from the output of the two-to-one data selector 112 to the TIP register 102. Whichever value is provided from the output of the two-to-one data selector 112 is loaded into the TIP register 102 in response to a transition of a TIP_Clk signal provided at a clock input of the TIP register 102. In a preferred embodiment, the TIP_Clk signal is generated on a demand basis, using circuitry such as is disclosed in co-pending and commonly assigned U.S. patent application Ser. No. 08/451,219, entitled "CIRCUIT FOR GENERATING A DEMAND-BASED GATED CLOCK", now U.S. Pat. No. 5,598,112 filed on even date herewith. The value provided from the output of the two-to-one data selector 112 is also loaded into the DIP_L register 104 in response to a transition of a DIP_Clk signal provided at a clock input of the DIP_L register 104. As with the TIP_Clk signal, the DIP_Clk signal is also preferably generated on a demand basis.

Referring now to the Next_DIP_H value output from the two-to-one data selector 122, the Next_DIP_H value is provided to a first data input of the two-to-one data selector 114. The "Jump Address" value is provided to the second data input of the two-to-one data selector 114 and asserts the Branch_Taken signal is provided to the select input of the two-to-one data selector 114.

If the Branch_Taken signal is not asserted, the Next_DIP. H value is provided from the output of the two-to-one data selector 114 to the DIP_H register 106. On the other hand, if the Branch_Taken signal is asserted, the Jump_Address value is provided from the output of the two-to-one data selector 114 to the DIP_H register 102. Whichever value is provided from the output of the two-to-one data selector 114 is loaded into the DIP_H register 106 in response to a transition of the DIP_Clk signal provided at a clock input of the DIP_H register 106.

Referring back to the one bit buffer 118, which buffers the carry signal 116 from the adder 110, the value held in the one bit buffer 118 is reset by a New_Op signal provided by the decoder after the TIP register 102, DIP_L register 104, and DIP_H register 106 have been updated. For example, the decoder may provide the New_Op signal as it begins to decode a new instruction in the line buffer.

Having now described an embodiment of the invention, it should be readily apparent to one skilled in the art that the four bit adder 110 and the twenty-eight bit incrementer 120 employs fewer transistors, and thus occupies less chip "real estate" and consumes less power, than a thirty-two bit adder which would otherwise be required for updating the DIP.

It should be understood that various alternatives to the embodiments of the invention described herein may be employed in practicing the invention. For example, based on the teaching provided herein, it would be well within the ability of one skilled in the art to implement the invention utilizing a different size TIP register, DIP register, and line buffer from that described herein. In this case, depending on the size of the TIP register relative to the instruction length, the carry signal may indicate a carry across more than one bit. The buffer 118 would hold this information, and the DIP_H register would be modified accordingly.

As another example, it would be well within the ability of one skilled in the art to substitute a subtractor for the adder 110 and a decrementer for the incrementer 120, in which case the carry signal 116 would indicate a borrow.

Furthermore, the invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA"; U.S. patent application Ser. No. 08/451965, entitled "SERIAL INTERFACE CAPABLE OF OPERATING IN TWO DIFFERENT SERIAL DATA TRANSFER MODES"; U.S. patent application Ser. No. 08/453,076, entitled "HIGH PERFORMANCE MULTIFUNCTION DIRECT MEMORY ACCESS (DMA) CONTROLLER"; U.S. patent application Ser. No. 08/452,001, entitled "OPEN DRAIN MULTI-SOURCE CLOCK GENERATOR HAVING MINIMUM PULSE WIDTH"; U.S. patent application Ser. No. 08/451, 503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION"; U.S. patent application Ser. No. 08/451,924, entitled "EXECUTION UNIT ARCHITECTURE TO SUPPORT x86 INSTRUCTION SET AND x86 SEGMENTED ADDRESSING"; U.S. patent application Ser. No. 08/451,444, entitled "BARREL SHIFTER"; U.S. patent application Ser. No. 08/451,204, entitled "BIT SEARCHING THROUGH 8, 16, OR 32-BIT OPERANDS USING A 32-BIT DATA PATH"; U.S. patent application Ser. No. 08/451,195, entitled "DOUBLE PRECISION (64-BIT) SHIFT OPERATIONS USING A 32-BIT DATA PATH"; U.S. patent application Ser. No. 08/451,571, entitled "METHOD FOR PERFORMING SIGNED DIVISION"; U.S. patent application Ser. No. 08/452,162, entitled "METHOD FOR PERFORMING ROTATE THROUGH CARRY USING A 32-BIT BARREL SHIFTER AND COUNTER"; U.S. patent application Ser. No. 08/451,434, entitled "AREA AND TIME EFFICIENT FIELD EXTRACTION CIRCUIT"; U.S. patent application Ser. No. 08/451,535, entitled "NON-ARITHMETICAL CIRCULAR BUFFER CELL AVAILABILITY STATUS INDICATOR CIRCUIT"; U.S. patent application Ser. No. 08/445,563, entitled "TAGGED PREFETCH AND INSTRUCTION DECODER FOR VARIABLE LENGTH INSTRUCTION SET AND METHOD OF OPERATION"; U.S. patent application Ser. No. 08/450,153, entitled "PARTITIONED DECODER CIRCUIT FOR LOW POWER OPERATION" now U.S. Pat. No. 5,546,353; U.S. patent application Ser. No. 08/451,495, entitled "CIRCUIT FOR DESIGNATING INSTRUCTION POINTERS FOR USE BY A PROCESSOR DECODER"; U.S. patent application Ser. No. 08/451,219, entitled "CIRCUIT FOR GENERATING A DEMAND-BASED GATED CLOCK" now U.S. Pat. No. 5,598,112; U.S. patent application Ser. No. 08/451,214, entitled "INCREMENTOR/DECREMENTOR" now U.S. Pat. No. 5,583,453; U.S. patent application Ser. No. 08/451,150, entitled "A PIPELINED MICROPROCESSOR THAT PIPELINES MEMORY REQUESTS TO AN EXTERNAL MEMORY"; U.S. patent application Ser. No. 08/451,198, entitled "CODE BREAKPOINT DECODER"; U.S. patent application Ser. No. 08/445,569, entitled "TWO TIER PREFETCH BUFFER STRUCTURE AND METHOD WITH BYPASS"; U.S. patent application Ser. No. 08/445,564, entitled "INSTRUCTION LIMIT CHECK FOR MICROPROCESSOR"; U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE"; U.S. patent application Ser. No. 08/452,080, entitled "APPARATUS AND METHOD FOR EFFICIENT COMPUTATION OF A 486™ MICROPROCESSOR COMPATIBLE POP INSTRUCTION"; U.S. patent application Ser. No. 08/450,154, entitled "APPARATUS AND METHOD FOR EFFICIENTLY DETERMINING ADDRESSES FOR MISALIGNED DATA STORED IN MEMORY"; U.S. patent application Ser. No. 08/451,742, entitled "METHOD OF IMPLEMENTING FAST 486™ MICROPROCESSOR COMPATIBLE STRING OPERATION"; U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID"; U.S. patent application Ser. No. 08/451,507, entitled "DRAM CONTROLLER THAT REDUCES THE TIME REQUIRED TO PROCESS MEMORY REQUESTS"; U.S. patent application Ser. No. 08/451,420, entitled "INTEGRATED PRIMARY BUS AND SECONDARY BUS CONTROLLER WITH REDUCED PIN COUNT"; U.S. patent application Ser. No. 08/452,365, entitled "SUPPLY AND INTERFACE CONFIGURABLE INPUT/OUTPUT BUFFER"; U.S. patent application Ser. No. 08/451,744, entitled "CLOCK GENERATION CIRCUIT FOR A DISPLAY CONTROLLER HAVING A FINE TUNEABLE FRAME RATE"; U.S. patent application Ser. No. 08/451,206, entitled "CONFIGURABLE POWER MANAGEMENT SCHEME"; U.S. patent application Ser. No. 08/452,350, entitled "BIDIRECTIONAL PARALLEL SIGNAL INTERFACE"; U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY"; U.S. patent application Ser. No. 08/450,726, entitled "INTEGRATED CIRCUIT WITH TEST SIGNAL BUSES AND TEST CONTROL CIRCUITS" now U.S. Pat. No. 5,541,935; U.S. patent application Ser. No. 08/445,568, entitled "DECODE BLOCK TEST METHOD AND APPARATUS".

It is intended that the following claims define the scope of the invention and that methods and apparatus within the scope of these claims and their equivalents be covered thereby.

What is claimed is:

1. A circuit for designating the values of an M bit first pointer and of an N+M bit second pointer, comprising:

a first register circuit network which holds the M bit first pointer;

a second register circuit network which holds an M bit portion of the N+M bit second pointer;

a third register circuit network which holds the remaining N bit portion of the N+M bit second pointer;

a combiner circuit network connected to receive the M bit first pointer from the first register circuit network and that combines the received M bit first pointer with an externally provided data element length value to generate a new M bit first pointer, said combiner circuit network including a carry generator that selectively generates a carry signal;

first means for providing the new M bit first pointer for loading into the first register circuit network and for loading into the second register circuit network as the M bit portion of the N+M bit portion of the second pointer;

second means connected to receive the remaining N bit portion of the N+M bit second pointer from the third register circuit network and for selectively providing, in response to the carry signal, one of the received remaining N bit portion and a modified remaining N bit portion as a new remaining N bit portion and for loading the new remaining N bit portion into the third register circuit network.

2. The circuit of claim 1, wherein the combiner circuit network is an adder circuit network that combines by adding, and wherein the combiner circuit network generates the carry signal if the result of adding the received M bit first pointer with the externally provided data element length value exceeds M bits.

3. The circuit of claim 1, wherein the first means includes:

a data selector that receives the new M bit first pointer and that provides the new M bit first pointer for loading into the first register circuit network and the second register circuit network in response to an externally provided branch taken signal being unasserted.

4. The circuit of claim 3, wherein the data selector receives an M bit portion of an externally provided N+M bit jump address and provides the M bit portion of the jump address for loading into the first register circuit network and the second register circuit network, in place of the new M bit first pointer, in response to the externally provided branch taken signal being asserted.

5. The circuit of claim 1, wherein the second means includes:

a data selector that receives the new remaining N bit portion of the second pointer and that provides the new remaining N bit portion of the second pointer for loading into the third register circuit network in response to an externally provided branch taken signal being unasserted.

6. The circuit of claim 5, wherein the data selector receives an N bit portion of an externally provided N+M bit jump address and provides the N bit portion of the jump address for loading into the third register circuit network, in place of the new remaining N bit portion of the N+M bit second pointer, in response to the externally provided branch taken signal being asserted.

7. The circuit of claim 1, wherein the first means includes:

a first data selector that receives the new M bit first pointer and that provides the new M bit first pointer for loading into the first register circuit network and the second register circuit network in response to an externally provided branch taken signal being unasserted, and wherein the second means includes a data selector that receives the new remaining N bit portion of the second pointer and that provides the new remaining N bit portion of the second pointer for loading into the third register circuit network in response to the externally provided branch taken signal being unasserted.

8. The circuit of claim 7, wherein the first data selector receives an M bit portion of an externally provided N+M bit jump address and provides the M bit portion of the jump address for loading into the first register circuit network and the second register circuit network, in place of the new M bit first pointer, in response to the externally provided branch taken signal being asserted, and wherein the second data selector receives an N bit portion of an externally provided N+M bit jump address and provides the N bit portion of the jump address for loading into the third register circuit network, in place of the new remaining N bit portion of the N+M bit second pointer, in response to the externally provided branch taken signal being asserted.

9. A method of designating the values of an M bit first pointer and of an N+M bit second pointer, comprising:

holding an M bit first pointer in a first register circuit network;

holding an M bit portion of the N+M bit second pointer in a second register circuit network;

holding a remaining N bit portion of the N+M bit second pointer in a third register circuit network;

receiving the M bit first pointer from the first register circuit network, combining the received M bit first pointer with an externally provided data element length value to generate a new M bit first pointer, and selectively generating a carry signal;

providing the new M bit first pointer for loading into the first register circuit network and for loading into the second register circuit network as the M bit portion of the N+M bit portion of the second pointer;

receiving the remaining N bit portion of the N+M bit second pointer from the third register circuit network and selectively providing, in response to the carry signal, one of the received remaining N bit portion and a modified remaining N bit portion as a new remaining N bit portion; and providing the new remaining N bit portion for loading into the third register circuit network.

* * * * *